L. D. STEPHENSON.
WHEEL FOR MOTOR CYCLES.
APPLICATION FILED FEB. 12, 1917.
1,268,641.
Patented June 4, 1918.
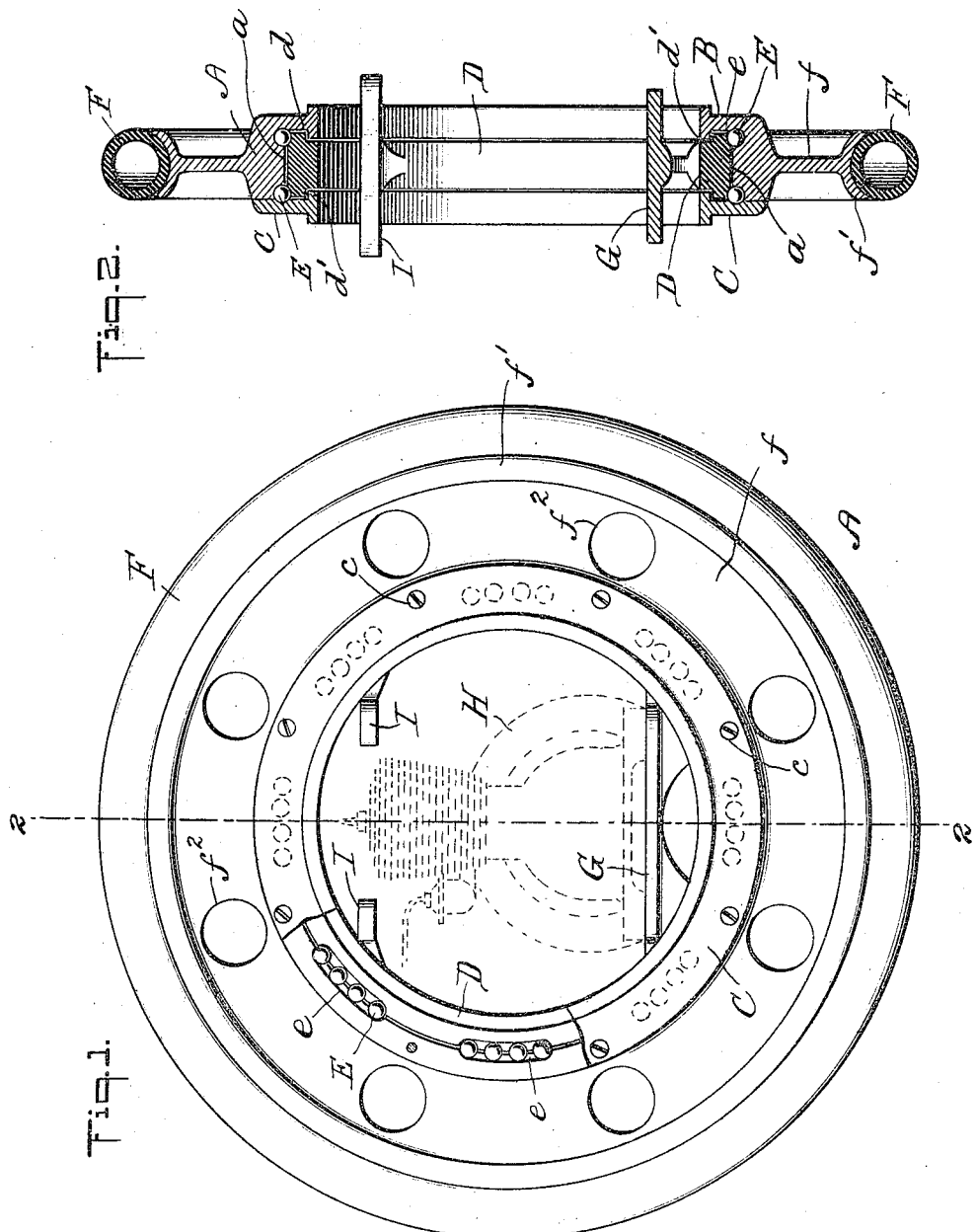
WITNESS
INVENTOR
Leonard D. Stephenson
BY
ATTORNEY his expedient herein referred to and shown, it being

UNITED STATES PATENT OFFICE.

LEONARD D. STEPHENSON, OF NEW YORK, N. Y., ASSIGNOR OF ONE-THIRD TO EDWARD T. PAULL, OF NEW YORK, N. Y.

WHEEL FOR MOTOR-CYCLES.

1,268,641.

Specification of Letters Patent.

Patented June 4, 1918.

Application filed February 12, 1917. Serial No. 147,974.

*To all whom it may concern:*

Be it known that I, LEONARD D. STEPHENSON, a citizen of the United States, residing at the city of New York, borough of Manhattan, county and State of New York, have invented a certain new and useful Wheel for Motor-Cycles, of which the following is a specification.

This invention is a wheel, the same being adapted for use more particularly in connection with or as a part of a motorcycle, although it is not intended to confine the use of the wheel to vehicles of this particular type.

The object of the invention is to enable a motor or engine to be carried substantially within the wheel, whereby a compact organization is obtained. The motor may be connected directly with the traction wheel, and said motor is positioned rearwardly of the driver or operator, thus relieving the driver from the discomfort of the heat radiated from engines of the internal combustion type.

The wheel of this invention is, for all practical purposes, devoid of a hub and axle, and in lieu thereof an open ring is provided, the diameter and cross section of which ring are such as to afford ample capacity for the reception of the motor or engine. The wheel is provided on its exterior with a suitable felly, the interior of said ring being provided with means for the reception of bearing balls. Said balls are in contact with the wheel engine-carrying ring so that the wheel proper is mounted or adapted for rotation upon the peripheral portion of said ring.

In a preferred form, the wheel is provided with a permanent flange and with a removable flange positioned in coöperative relation to the bearing balls and to the engine-carrying ring whereby the latter is retained in coöperative relation to the wheel.

Further, the inner ring is, or may be, provided with a bed plate for mounting the motor or engine, and said ring is, or may be, constructed with lugs to which the forks or members of the frame are attached, thus holding the ring in fixed relation to the frame whereas the wheel is free to rotate around the ring in such manner as to evolve the least friction between the stationary and moving parts.

Other features and advantages of the invention will appear from the following description taken in connection with the drawings, wherein—

Figure 1 is a side elevation of a wheel embodying this invention, the removable flange being partly broken away to show the bearing balls, and Fig. 2 is a vertical section on the line 2—2 of Fig. 1.

The wheel A is provided with an interior channel $a$, one wall of which is bounded by a flange B, preferably integral with the wheel and positioned on one side thereof. A removable flange C is positioned in contact with the other side of the wheel so as to bound the channel $a$, said flange C being secured fixedly in position to the wheel by any suitable means, such as the screws $c$.

D is the engine-carrying member, the same being in the form of a ring or annulus. This ring D is fitted within the channel $a$ and it is retained therein by flanges B, C, a part of the ring being exposed within the wheel, as shown clearly in Fig. 2. It is preferred to recess the ring on its inner edges, as at $d$, and to provide the flanges B C with inwardly extending edges $d'$, the latter fitting within the recesses $d$ and providing a compact disposition of the parts whereby said ring D cannot become displaced with respect to the wheel.

For reducing friction and wear upon the surfaces of the stationary and moving parts, ball bearings are provided within the channel. As shown, the wheel and the ring are constructed with ball races $e$ in which are positioned the bearing balls E, the latter being retained in contact with the edge portions of the ring D by flanges B, C.

The wheel is shown as having a web $f$ and a rim or felly $f'$, said web being provided with apertures $f^2$ for reducing the metal and the weight of the wheel, whereas the rim $f'$ accommodates a tire F of any usual or preferred construction.

The ring or annulus D is of large diameter, said ring replacing the hub and axle of ordinary motorcycles. The diameter and cross sectional size of the ring D afford ample space for the reception of a motor or engine, and this ring is provided with means for mounting or carrying said motor or engine, and with means for the attachment of the members or forks comprising a part of the frame of the motor vehicle.

Various means may be resorted to for mounting the motor or engine within the ring D and for the attachment of the frame forks. As shown, however, the ring is provided with a bed plate G which is positioned within the peripheral portion of the ring and is adapted for the reception of the motor or engine, the latter being indicated by dotted lines at H in Fig. 1. It is apparent that any form of engine or motor may be used, the same being arranged within the peripheral portion of the ring and fastened in a suitable way to the bed plate G.

Furthermore, the ring is provided with plates or lugs I positioned within the peripheral portion of the rim and extending into the open space thereof, said plates or lugs being of a form suitable for the attachment of the forks or members of the frame. The ring and its contained parts occupy a fixed position with respect to the other members of the motorcycle, whereas the wheel A is mounted upon the peripheral portion of the ring for rotation freely with respect thereto.

From the foregoing description taken in connection with the drawings it will be noted that the wheel is minus the hub and rear axle usually provided in motorcycles and, further, that the large diameter ring D provides ample space within the wheel for the accommodation of the motor or engine, suitable provision being made for the attachment of certain parts of the frame rigidly to the engine-carrying ring so as to retain said ring and the engine in a stationary position within the machine. The engine is positioned rearwardly of the driver, the same being a desirable arrangement, particularly when an internal combustion engine is employed, for the reason that the driver is not exposed to the heat radiated from the engine. Furthermore, the location of the engine within the limits of the wheel enables suitable provision to be made for the direct connection of the engine with the wheel, although I have not considered it necessary in this application to disclose means whereby the engine and the wheel are connected to utilize the power of the engine in the propulsion of the wheel. Again, the wheel is mounted for rotation freely upon the stationary ring in a manner to minimize the friction between the stationary and moving parts, and the entire construction provides for ready accessibility to the engine, although located within the limits of the wheel. The parts are simple, efficient and reliable, so that they will not get out of order.

Having thus fully described the invention, what I claim as new, and desire to secure by Letters Patent is:

1. In a structure of the class described, the combination of a wheel provided with an interior channel and with a permanent flange bounding one wall of said channel, a removable flange bounding the other wall of said channel, an annular member positioned partly within the channel and between the wheel flanges, and bearing balls coöperating with the annular member and the wheel, said annular member being provided with means for mounting a motor or engine.

2. In a structure of the class described, the combination of an annular member provided interiorly thereof with means for supporting an engine or motor, a wheel provided with a channel internally thereof, within which channel the annular member is positioned for the wheel to rotate freely with respect to said member, and means for effecting an overlapping relation intermediate said wheel and the inner marginal portion of said annular member.

3. In a structure of the class described, the combination of an annular member provided interiorly thereof with means for supporting an engine or motor, a wheel provided with a channel internally thereof, within which channel the annular member is positioned for the wheel to rotate freely with respect to said member, and marginal flanges extending from the wheel at the respective sides of the channel therein, said marginal flanges having overlapping contact with the inner marginal portion of said annular member.

4. In a structure of the class described, the combination with a wheel provided with an internal channel, of an annular member having motor-carrying means positioned within the open space thereof, said annular member being provided with grooves in the side edges at the inner marginal portion thereof, and flanges unitary with the wheel, said flanges being positioned to enter said grooves at the inner marginal portion of the annular member.

5. In a structure of the class described, the combination of a wheel provided at the respective sides thereof with flanges positioned to form an annular recess, an annular member provided in the open space thereof with means for supporting a motor, said annular member being positioned between said flanges and within the annular recess, means for effecting an overlapping relation between the flanges and the inner marginal portion of the annular member, and bearing balls in contact with the exterior marginal portion of the annular member and with the inner surface of the annular recess of the wheel.

In testimony whereof I have hereunto signed my name.

LEONARD D. STEPHENSON.

Copies of this patent may be obtained for five cents each, by addressing the "Commissioner of Patents, Washington, D. C."